United States Patent
Newton et al.

(10) Patent No.: US 9,794,247 B2
(45) Date of Patent: Oct. 17, 2017

(54) METHOD TO PREVENT CLONING OF ELECTRONIC COMPONENTS USING PUBLIC KEY INFRASTRUCTURE SECURE HARDWARE DEVICE

(75) Inventors: Sean Newton, Austin, TX (US); John Tran, Austin, TX (US); David Tamagno, Austin, TX (US)

(73) Assignee: STMICROELECTRONICS, INC., Coppell, TX (US)

( * ) Notice: Subject to any disclaimer, the term of this patent is extended or adjusted under 35 U.S.C. 154(b) by 1236 days.

(21) Appl. No.: 11/507,679

(22) Filed: Aug. 22, 2006

(65) Prior Publication Data
US 2008/0052518 A1   Feb. 28, 2008

(51) Int. Cl.
| H04L 29/06 | (2006.01) |
| G03G 21/18 | (2006.01) |
| G06F 21/31 | (2013.01) |
| G03G 15/08 | (2006.01) |

(52) U.S. Cl.
CPC ..... *H04L 63/0823* (2013.01); *G03G 15/0863* (2013.01); *G03G 21/1878* (2013.01); *G06F 21/31* (2013.01); *G03G 2215/0697* (2013.01); *G03G 2221/1823* (2013.01); *G06F 2221/2129* (2013.01); *H04L 63/06* (2013.01)

(58) Field of Classification Search
CPC ..... G06F 21/31; H04L 63/06; H04L 63/0823; G03G 15/0863; G03G 21/31; G03G 21/1878; G03G 2215/0697; G03G 2221/1823; G03G 2221/2129
USPC ................. 713/156, 168, 170, 176
See application file for complete search history.

(56) References Cited

U.S. PATENT DOCUMENTS

| 2003/0172268 A1 | 9/2003 | Walmsley et al. | |
| 2004/0003227 A1 | 1/2004 | Reinold et al. | |
| 2004/0168071 A1* | 8/2004 | Silverbrook | 713/189 |
| 2005/0166051 A1* | 7/2005 | Buer | 713/173 |
| 2005/0172118 A1* | 8/2005 | Nasu | 713/156 |

(Continued)

FOREIGN PATENT DOCUMENTS

GB  2 354 735 A  4/2001

OTHER PUBLICATIONS

TPM Main, Part 3 Commands, Specification Version 1.2, Revision 62, Oct. 2, 2003, pp. 101-102, 165-166.*

(Continued)

*Primary Examiner* — Beemnet Dada
(74) *Attorney, Agent, or Firm* — Seed IP Law Group LLP

(57) ABSTRACT

An electronic component includes a processor and a memory. The electronic component has a secure platform capable of storing at least one dual key pair and a corresponding digital signature. There is also a system including a host machine and an electronic component capable of being operated by the host machine. The electronic component has a processor, a memory, and a secure platform capable of storing at least one dual key pair and a corresponding digital signature. Another aspect describes a method, which includes reading a public key from an electronic component by a host machine, verifying the public key against a stored key in the host machine, digitally signing data using a private key from the electronic component, verifying the signed data against the stored key, and using the electronic component by the host machine only if the signed data and the public key are verified.

20 Claims, 2 Drawing Sheets

(56) References Cited

U.S. PATENT DOCUMENTS

| | | | |
|---|---|---|---|
| 2005/0257259 A1* | 11/2005 | Torre-Bueno | 726/17 |
| 2006/0149966 A1 | 7/2006 | Buskey et al. | |
| 2006/0271796 A1* | 11/2006 | Kaimal | G06F 21/64 713/194 |
| 2006/0279588 A1* | 12/2006 | Yearworth et al. | 347/6 |
| 2008/0024268 A1* | 1/2008 | Wong et al. | 340/5.8 |

OTHER PUBLICATIONS

European Search Report dated Jan. 27, 2009 in connection with European Patent Application No. EP 07 25 3085.
European Examination Report dated Sep. 9, 2011 in connection with European Patent Application No. EP 07 25 3085.0.

\* cited by examiner

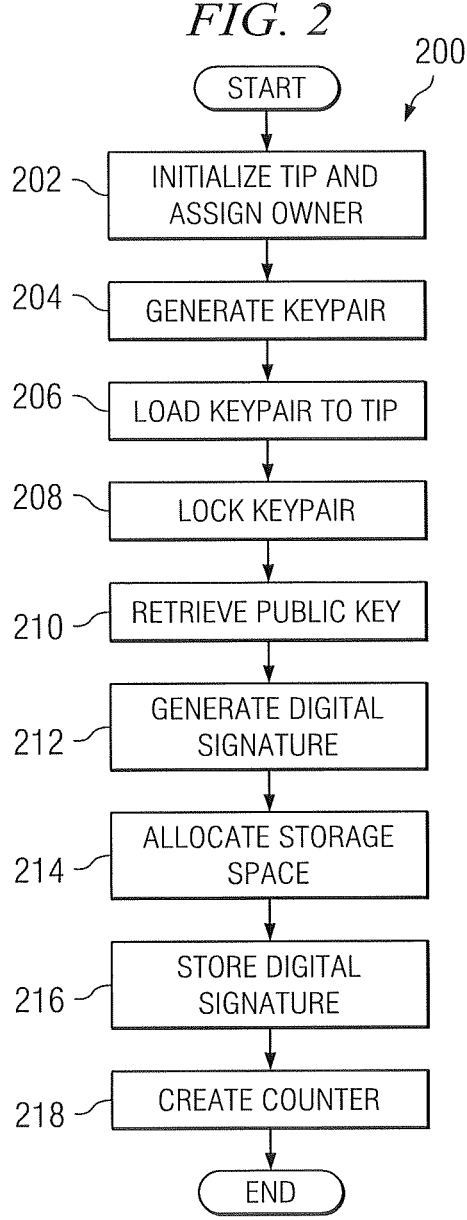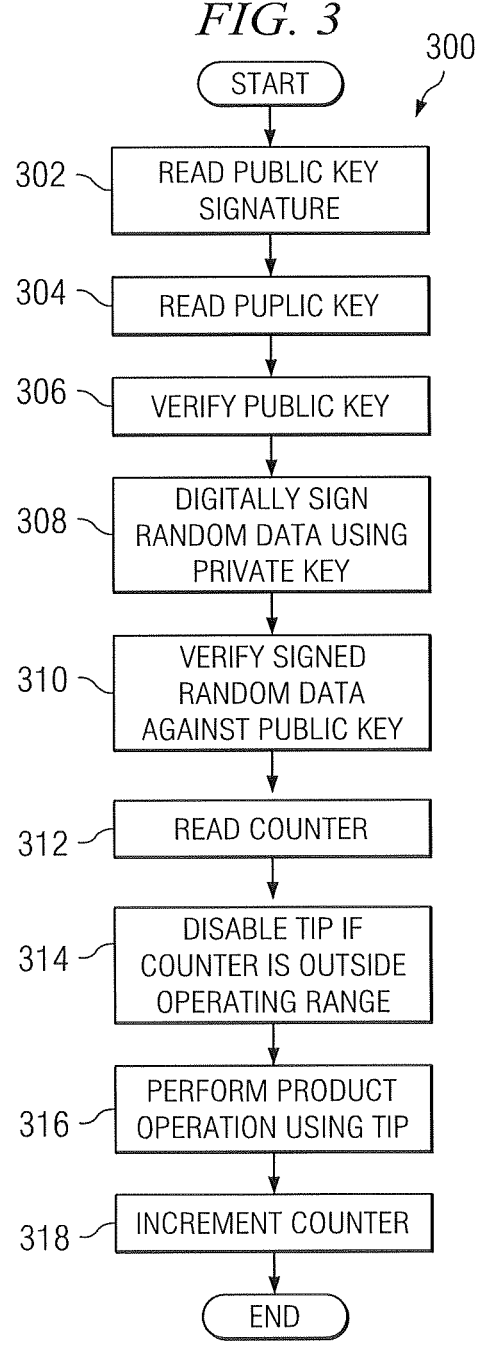

METHOD TO PREVENT CLONING OF ELECTRONIC COMPONENTS USING PUBLIC KEY INFRASTRUCTURE SECURE HARDWARE DEVICE

TECHNICAL FIELD

This disclosure is generally directed to verification and authentication of electronic components, and more specifically to a method to prevent cloning of electronic components using public key infrastructure secure hardware devices.

BACKGROUND

Manufacturers often seek to prevent their products from being copied or counterfeited. For example, Original Equipment Manufacturers (OEMs) of electronic goods who sell disposable or replacement components for their primary product offerings may want to prevent the cloning of these components by non-OEM manufacturers. As a particular example, a printer manufacturer may make only a slim profit, or none at all, in the sales of the printers themselves and rely on sales of compatible ink or toner products to make the business economically viable. In other cases, a product manufacturer may have quality-control and customer-satisfaction reasons for needing to ensure that any replaceable components are fully compatible and manufactured by a licensed or approved manufacturer.

SUMMARY

According to various disclosed embodiments, there is provided an electronic component including a processor and a memory. The electronic component has a secure platform capable of storing at least one dual key pair and a corresponding digital signature.

According to other disclosed embodiments, there is provided a system including a host machine and an electronic component capable of being operated by the host machine. The electronic component has a processor, a memory, and a secure platform capable of storing at least one dual key pair and a corresponding digital signature.

According to yet other disclosed embodiments, there is provided a method that includes reading a public key from an electronic component by a host machine. The method also includes verifying the public key against a stored key in the host machine, digitally signing data using a private key from the electronic component, and verifying the signed data against the stored key. In addition, the method includes using the electronic component by the host machine only if the signed data and the public key are verified.

Other technical features may be apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 2 depicts a process in accordance with this disclosure;

FIG. 3 depicts a process for using a tip in accordance with this disclosure.

DETAILED DESCRIPTION

Figure 1:
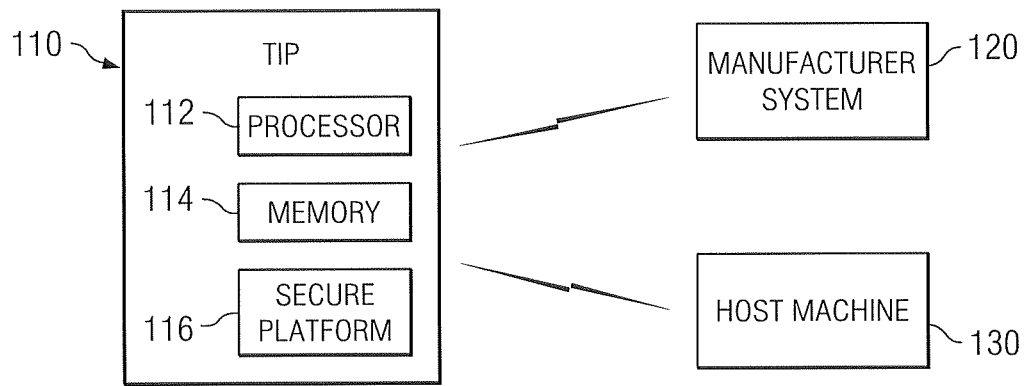
FIG. 1 depicts a block diagram of components in accordance with this disclosure.

FIGS. 1 through 4 and the various embodiments described in this disclosure are by way of illustration only and should not be construed in any way to limit the scope of the invention. Those skilled in the art will recognize that the various embodiments described in this disclosure may easily be modified and that such modifications fall within the scope of this disclosure.

Various embodiments include a system and method to prevent cloning of electronic components, including disposable or re-usable components, using public key infrastructure techniques with a secure hardware device. The end electronic component to be protected is referred to herein as a "tip." Various disclosed embodiments include providing the end component with a secure hardware device that is used to verify the authenticity of the end component. In this way, components that do not utilize this hardware device cannot run on the primary product.

For ease of reference, the following acronyms and abbreviations are used herein:
EK Endorsement Key
NV Storage Non-Volatile Storage
OEM Original Equipment Manufacturer or other authorized manufacturer
PCR Platform Configuration Register
PKI Public Key Infrastructure
RSA RSA Public Key Cryptography Algorithm
SRK Storage Root Key
TCG Trusted Computing Group
TPM Trusted Platform Module In various embodiments, the tip includes a security device to uniquely identify it as an OEM product or for use in verifying or authenticating it. The tip connects to a controlling host via an electronic interface. The host controls operation of the tip and has the ability to authenticate, use, and invalidate the tip. In various embodiments, the disclosed systems and methods prevent third-party manufacturing and prevent attempts to extend the recommend life of an OEM tip.

According to various disclosed embodiments, a security device is integrated with the electronic components of the tip. Host machines are configured so that if the security device is removed, the tip does not operate.

In some embodiments, tips can be pre-configured by an OEM at the OEM's manufacturing facility. After configuration, the tip is packaged and sent to an end-user. During the use of the tip, the host checks the security device, determines the authenticity of the tip, and checks that the tip's lifetime limits have not been exceeded. After a certain usage, the host can invalidate a tip, making it inoperable for future usage. Three life-cycle phases of the model may include factory configuration, field usage, and end of life.

PKI technologies and PKI certificates are well known to those of skill in the art. A public key infrastructure (PKI) is a common term for a system that enables persons or devices to exchange data securely and privately through the use of a public and private cryptographic key pair that is obtained and shared through a trusted authority. PKI provides for a digital certificate that can identify an individual or an organization and directory services that can store and, when necessary, revoke the certificates. The comprehensive architecture includes key management, registration authority, certificate authority, and various administrative tool sets.

A "private key" or "private certificate" generally refers to the private part of a two-part, dual-key asymmetric cryptography system. Often, the private key is provided by a certificate authority, kept secret and never transmitted to other parties. A "public key" or "public certificate" generally refers to the public part of the dual-key asymmetric cryptography system. The public key is often publicly available from keyservers. In general, data that is encrypted with one of the keys of a dual-key pair can only be decrypted by the other key. In typical use for encryption, data is encrypted using a public key and can only be decrypted by the recipient's private key.

Similarly, each key can be used to "sign" data to identify the recipient. Obviously, it is of slight utility to sign data using a public key since this key may be available to any number of people. In contrast, if data is signed by a user's (or enterprise's) private key, then the signature can be verified by anyone with the public key as having been signed by that specific private key.

In various embodiments discussed in more detail below, PKI techniques are used to both encrypt and sign digital data. Some embodiments use a Trusted Platform Model (TPM) as defined by the Trusted Computing Group (TCG). The Trusted Computing Group was is formed in 2003 to develop and support open industry specifications for trusted computing across multiple platform types. The TPM is a microcontroller that stores keys, passwords, and digital certificates. It typically is affixed to the motherboard of a PC, although it potentially can be used in any computing device that requires these functions. The nature of the TPM ensures that the information stored there is made more secure from external software attack and physical theft. Security processes, such as digital signature and key exchange, are protected through the secure TCG subsystem. Access to data and secrets in a platform could be denied if the boot sequence is not as expected. Critical applications and capabilities, such as secure email, secure web access, and local protection of data, are thereby made much more secure.

TPM and TCG commands are known to those of skill in the art and can be used to implement some disclosed embodiments. Where such commands are used below, those of skill in the art will recognize that these are used as examples only, and other implementations can use other security tools or custom programming to obtain similar functionality.

During factory configuration, in some embodiments, there is a one-time certificate setup. An asymmetric PKI Certificate is created with the private certificate stored in a secure location, such as at the OEM manufacturer site. The corresponding public certificate is available and is loaded on host machines. OEM-supplied TPMs are supplied for integration into the tip hardware.

FIG. 1 depicts a block diagram of components in accordance with this disclosure. Tip 110 can be any electronic component that is to be protected against cloning or unauthorized use. In particular embodiments, tip 110 is a disposable or replaceable electronic component manufactured by an OEM manufacturer. In other embodiments, tip 110 is attached to or integral with an electronic component (not shown) that is to be protected against cloning or unauthorized use, but the tip 110 does not perform the core functions of the electronic component. Tip 110 can include a processor 112 and a memory 114. Memory 114 can include a non-volatile storage.

Tip 110 can also include secure platform 116, which could be a Trusted Platform Module (TPM). Although shown separately here, secure platform 116 can be stored in memory 114 and managed by processor 112. Secure platform 116 can store a dual key pair and corresponding digital signature. Secure platform 116 can also include a monotonic counter, which is described below. In particular embodiments, tip 110 can be a printer ink cartridge, printer toner cartridge, disposable camera, or any number of other electronic components.

Also depicted in FIG. 1 is manufacturer system 120 that is capable of communicating with tip 110 as described herein. Manufacturer system 120 can be implemented as any known data processing system and is capable of configuring and operating tip 110.

Also depicted in FIG. 1 is host machine 130 that is capable of communicating with tip 110, as described herein. Host machine 130, in some embodiments, is the device that uses the core functions of the electronic component comprising tip 110. For example, where tip 110 is a printer ink cartridge, host machine 130 can be the printer that uses the printer ink cartridge.

FIG. 2 depicts a process in accordance with this disclosure. The process of FIG. 2 can be used for tip initialization, and it can be performed as the final configuration of each tip 110 on the factory floor.

At step 202, a new tip is initialized, and the secure platform on the tip is assigned an owner. In some embodiments, TPM_TakeOwnership is executed on the tip with well known user and SRK authorization values. This command inserts the TPM Ownership value into the TPM.

At step 204, the tip generates an asymmetric dual-key keypair. In some embodiments, the tip generates a public/private RSA key pair (TPM_CreateWrapKey) that will be used for TPM signing/host verification: KeyName=SignKeyA. In particular embodiments, the keypair has a 1024-bit key strength, a key type signature, is non-migratable, and is non-volatile. The TPM_CreateWrapKey command both generates and creates a secure storage bundle for asymmetric keys. The newly created key can be locked to a specific PCR value by specifying a set of PCR registers.

At step 206, the private and public keys of the keypair are loaded into the secure platform on the tip. In some embodiments, the tip loads the newly created key SignKeyA into the TPM using TPM_LoadKey. The TPM_LoadKey function loads the key into the TPM for further use.

At step 208, the secure platform on the tip is configured to secure the stored private and public keys. In some embodiments, the tip locks SignKeyA into the TPM so it cannot be removed without ownership permission (TPM_KeyControlOwner). This command controls some attributes of keys that are stored within the TPM key cache. If the OwnerEvict bit is set to true, this key remains in the TPM through all TPM_Startup events. The only way to evict this key is for the TPM Owner to execute this command again, setting the owner control bit to false and then executing TPM_FlushSpecific. The key handle may not reference an authorized entity and may not be validated.

At step 210, the public key of the keypair is retrieved from the TPM. In some embodiments, the tip gets the public key from SignKeyA using TPM_GetPubKey. The owner of a key may wish to obtain the public key value from a loaded key. This information may have privacy concerns, so the command may require authorization from the key owner.

At step 212, a digital signature of the public key is generated. In some embodiments, the tip signs the public key portion of SignKeyA with an OEM private key certificate to produce a signature SignKeyPubSig.

At step 214, nonvolatile storage space for the digital signature is allocated. In some embodiments, the tip creates NV storage space according to the size of SignKeyPubSig. TPM_NV_DefineSpace establishes the space necessary for the indicated index. The definition may include the access requirements for writing and reading the area. The space definition size may not include the area needed to manage the space.

At step 216, the digital signature is stored in the nonvolatile storage space. In some embodiments, the tip stores SignKeyPubSig in the TPM NV storage space (TPM_NV_WriteValue). TPM_NV_WriteValue writes the value to a defined area. The write can be TPM Owner authorized or unauthorized, protected by other attributes, and work when no TPM Owner is present.

At step 218, a counter to monitor tip usage is created. In some embodiments, the tip creates a monotonic counter to be used for tip usage tracking (TPM_CreateCounter). The default initial value may be one upon creation of the counter. TPM_CreateCounter creates the counter but may not select the counter. Counter creation assigns an AuthData value to the counter and sets the counters original start value. The original start value is the current internal base value plus one. Setting the new counter to the internal base avoids attacks on the system that are attempting to use old counter values.

The tip is now ready to be released for sale or distribution.

FIG. 3 depicts a process for using a tip in accordance with this disclosure. Here, it is assumed that the host machine has the OEM Public Key Certificate corresponding to the tip and the OEM tip manufacturer and that the tip is already configured and initialized with a secure platform, such as TPM, as described above. The tip is also assumed to be connected to the host machine for user operation.

At step 302, the public signature is read from the tip nonvolatile storage. In some embodiments, this is done by reading SignKeyPubSig from the TPM NV storage. At step 304, the public key is read from the secure platform. In some embodiments, this is done by reading SignKeyPub from the TPM. At step 306, the signature of the public key that was signed by the OEM private key certificate at the OEM factory is verified using the public key and the signature of the public key. In some embodiments, this is done by verifying SignKeyPubSig with SignKeyPub using the OEM public key certificate.

At step 308, the tip signs random data using the private key to generate digitally signed random data. In some embodiments, the TPM signs random data with the SignKeyPriv inside the TPM and produces RandomSignature. At step 310, the host machine verifies the digitally signed random data using the public key, thereby verifying that the tip private key corresponds to the stored public key. In some embodiments, the host machine verifies RandomSignature with random data using SignKeyPriv, verifying that the SignKeyPub is a true asymmetric key unique to the TPM.

At step 312, the host machine reads the value from the monotonic counter in the tip. At step 314, the host machine checks that this value is within the operating usage limit of the tip. If the usage value is exceeded, the tip is disabled. At step 316, the host machine performs product operation using the tip. At step 318, the host machine increments the monotonic counter on the tip to reflect usage.

Figure 4:
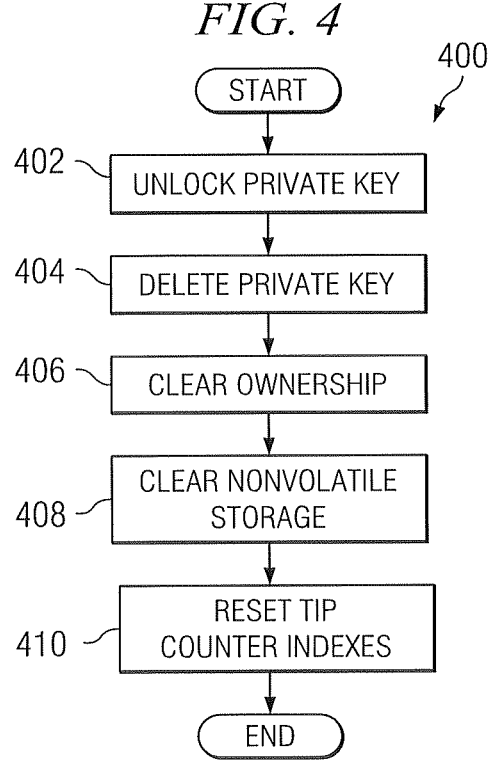
FIG. 4 depicts a process to disable a tip in accordance with this disclosure.

FIG. 4 depicts a process to disable a tip in accordance with this disclosure. This process can be performed at the end of the tip life, such as when a tip has exceeded the OEM-defined lifetime usage count.

At step 402, the host machine unlocks the private key from the tip secure platform. In some embodiments, the host machine unlocks SignKeyA from TPM. At step 404, the host machine deletes the private and public keys from the tip. In some embodiments, the host machine deletes SignKeyA from TPM. At step 406, the host machine clears the ownership in the tip secure platform. In some embodiments, the host machine clears TPM Ownership. At step 408, the host machine clears all data in the tip NV storage. At step 410, the host machine resets all tip counter index references. The monotonic start value remains at the last value for any new counter applications. At this point, the tip is completely disabled and can be discarded.

Various embodiments use public/private asymmetric key pairs. In some embodiments, three public/private key pairs are used. The Endorsement Key (EK) is the first public/private key pair used in some embodiments in the TPM. The EK can be injected into the TPM at the time of silicon manufacture in a secure environment. The EK can also be created by the TPM through a one-time client request. The EK key pair has the property of being statistically unique (meaning that as it is a very large number, the chances of producing an identical key pair are extremely low). The private part of the EK is only known by the TPM and resides in the TPM's secure storage. The EK has two primary uses in various embodiments: to encrypt the owner and SRK authorization values and to establish a TPM identity key, as known to those familiar with the TCG TPM specification.

In various embodiments, the next public/private key pair is called the Storage Root Key (SRK). The SRK is generated within the TPM when ownership is taken. The private part of this key is known only by the TPM, and the key pair is also statistically unique. The owner of the TPM is analogous to a system administrator. This key is the start of the protected key hierarchy needed to hold other types of asymmetric key pairs.

The third TPM key pair used in various embodiments is a signing key. The signing key is created inside the TPM and stored below the SRK for use in signing data by the TPM. This key is preloaded and locked so that it cannot be removed from the TPM except by the owner. The other purpose of this key is that it can be used as the unique identifier of the TPM and is in turn signed by the Factory Certificate. It is also used to attest that the private key part of the signature key pair is valid, therefore asserting that the TPM is valid and was configured at the OEM's factory.

The TPM also has the ability to store data in the secure storage area of the TPM. This data store is created and an index is used to access the storage area. Access to reads and writes to this area may be protected by the owner usage authorization.

In some embodiments as described above, the TPM contains a feature called a monotonic counter. In particular embodiments, the TPM can support up to four monotonic counters with the unique property that the core count of the monotonic counter always increases sequentially by one when any counter is incremented and is non-reputable (it cannot be set to a defined value or cleared). This allows a host system to keep track of a usage count that cannot be set by an ad-hoc write command. Upon increment, the core counter is increased by one and copied into the value holder of a specific counter.

There are many other features and commands available with a secure platform, such as the TPM, that can be exploited by the disclosed embodiments. Listed below are a few other methods that can enhance the security model for anti-cloning as disclosed herein.

Secure Transport: The TPM can create a secure transport layer with the host machine. The transport layer can encrypt all command transactions between the host machine and the TPM. More importantly, after completion of a command sequence within a transport session, a signature can be obtained over a log of the transport session, providing authentication to the host that all commands were sent and received correctly to the TPM. Such usage of the transport section can further secure data storage operations.

Platform Configuration Registers (PCR): A platform configuration register is a register held within the TPM that contains integrity metrics and can store data in such a way that prevents misrepresentation of presented values or of the sequence that they were presented. They can be tied to certain TPM operations, normally key operations, to ensure the operation only occurs when a PCR value matches the expected value within the operation. An example usage is to only allow signing operations to occur if the host is able to provide the correct integrity metrics of a host's firmware.

Most TPM commands use an authorization protection mechanism inherent to the TPM. The TPM operation model assumes that the authorization value is a protected value, such as a user-known password, and is not accessible directly on the target system. The authorization protection mechanisms are implemented by using a complex data exchange between the host and the TPM. These protection mechanisms may work on three major premises:

1) The authorization value is known and only known by the end-user and the TPM (the value is stored in secure memory).

2) Usage of the authorization value requires a shared session that passes random data to be used in calculation of the authorization codes. This random data provides protection against replay attacks.

3) The data integrity of the authorize message is calculated, both by the host and the TPM, to ensure that none of the data passed between the host and the TPM has been compromised.

In various embodiments, the initial authorization values used are set to a well-known value. This allows many tips to operate with a single host without having fixed authorization values for each tip. Although an attacker can determine this authorization value by interrogating the host machine, the PKI protections utilized in the various disclosed embodiments are constructed in such a way that the well-known authorization value may not compromise the primary security protections.

The following materials may provide additional background information on known techniques and are hereby incorporated by reference: TCG TPM Standard 1.2 rev[85] (available from trustedcomputinggroup.org), *Trusted Computing Platforms: TCPA Technology in Context* (Siani Pearson, 1$^{st}$ Ed. 2002), and PCKS #1 v2.0 RSA Cryptography Standard (RSA Laboratories, Oct. 1, 1998).

In some embodiments, various functions described above may be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. However, the various coding functions described above could be implemented using any other suitable logic (hardware, software, firmware, or a combination thereof).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An electronic component, comprising:
a processor and a memory, wherein the memory is configured to store a plurality of lifetime usage limits related to the electronic component; and
a secure platform having a plurality of un-resettable monotonic counters each configured to indicate usage of the electronic component at a different phase of the electronic component's life-cycle, the secure platform configured to store an ownership value, to generate at least one dual key pair and a corresponding digital signature, and to securely store at least a private key from the at least one dual key pair by locking the private key into the secure platform based on the ownership value so that the private key cannot be removed without permission from an owner of the electronic component able to supply the ownership value, wherein the secure platform is configured to identify and authenticate the electronic component to a host prior to operation with the host, to verify that the plurality of lifetime usage limits of the electronic component have not been exceeded, and to enable operation of the electronic component with the host only if the plurality of lifetime usage limits have not been exceeded,
wherein, upon the exceeding any of the plurality of lifetime usage limits, the secure platform is configured to invalidate the electronic component and to make the electronic component inoperable for future usage by deleting both the at least one dual key pair and the ownership value from the electronic component.

2. The electronic component of claim 1, wherein the secure platform is stored in a nonvolatile storage in the memory and is configured to be managed by the processor.

3. The electronic component of claim 1, wherein the plurality of un-resettable monotonic counters are used to indicate usage of a factory configuration life-cycle phase, a field usage life-cycle phase, and an end of life life-cycle phase.

4. The electronic component of claim 1, wherein the dual key pair includes the private key securely stored in the secure platform, the private key corresponding to a public key installed in at least one host machine.

5. The electronic component of claim 1, wherein the dual key pair includes a public key stored in the secure platform, and wherein the digital signature is generated from the public key.

6. The electronic component of claim 1, wherein the secure platform comprises a Trusted Platform Module.

7. The electronic component of claim 1, wherein the electronic component is a disposable component usable by a host machine.

8. The electronic component of claim 1, wherein the dual key pair is used to verify a manufacturer of the electronic component.

9. The electronic component of claim 1, wherein the electronic component can be disabled by a host machine.

10. The electronic component of claim 1, wherein the at least one dual key pair includes an endorsement key pair, a storage root key pair, and a signing key pair.

11. The electronic component of claim 1, wherein the secure platform is configured to create a secure transport layer with a host machine.

12. The electronic component of claim 1, wherein the electronic component is configured to be used in a printer.

13. A system, comprising:
a host machine; and
an electronic component configured to be operated by the host machine, the electronic component having a processor, a memory, and a secure platform, the secure platform having a plurality of un-resettable monotonic counters each configured to indicate usage of the electronic component at a different phase of the electronic component's life-cycle, the secure platform configured to store an ownership value, to generate at least one dual key pair and a corresponding digital signature, and to securely store at least a private key from the at least one dual key pair by locking the private key into the secure platform based on the ownership value so that the private key cannot be removed without permission from an owner of the electronic component able to supply the ownership value, wherein the secure platform is configured to be used to identify and authenticate the electronic component to the host machine prior to operation by the host machine, to verify that a plurality of lifetime usage parameters of the electronic component stored in the memory of the electronic component do not violate one or more rules programmed in the processor, and to enable operation of the electronic component by the host machine only if the plurality of lifetime usage parameters of the electronic component have not been crossed,
wherein, upon a determination that any of the plurality of lifetime usage parameters violates the one or more rules programmed into the processor, the secure platform is configured to invalidate the electronic component and to make the electronic component inoperable for future usage by deleting both the at least one dual key pair and the ownership value from the electronic component.

14. The system of claim 13, wherein the individual ones of plurality of un-resettable monotonic counters are configured to be used as individual ones of the plurality of lifetime usage parameters stored in the memory of the electronic device, to indicate usage of the electronic component by the host machine at different life-cycle phases of the electronic component.

15. The system of claim 13, wherein the dual key pair includes the private key secured in the secure platform, the private key corresponding to a public key installed in the host machine.

16. The system of claim 13, wherein the host machine includes a public key, and the host machine is configured to operate the electronic component only if the dual key pair corresponds to the public key.

17. The system of claim 13, wherein the electronic component is a disposable component for use by the host machine.

18. The system of claim 13, wherein the electronic component can be disabled by the host machine.

19. The system of claim 13, wherein the electronic component is configured to be disabled by the host machine if at least one usage counter of the electronic component exceeds a specified threshold.

20. A method, comprising:
authenticating a secure platform within an electronic component by
reading a public key from the electronic component by a host machine,
verifying the public key against a stored key in the host machine,
receiving data digitally signed by the electronic component using a private key securely stored within the electronic component and locked into the electronic component based on an ownership value so that the private key cannot be removed from the electronic component without permission from an owner of the electronic component able to supply the ownership value, and
verifying the digitally signed data using the stored key;
using the electronic component by the host machine only if the signed data and the public key are verified;
recording each usage of the electronic device at one or more different life-cycle phases of the electronic component to generate one or more total usages of the electronic device, wherein the recording includes advancing one of a plurality of un-resettable monotonic counters each configured to indicate one of the one or more total usages of the electronic component at a different phase of the electronic component's life-cycle; and
allowing continued usage of the electronic device only while each of the one or more total usages of the electronic device has not crossed a predetermined threshold and, upon a determination any of the one or more total usages has crossed its respective predetermined threshold, invalidating the electronic component and making the electronic component inoperable for future usage by deleting both the public and private keys and the ownership value for the secure platform from the electronic component.

* * * * *